April 18, 1944.　　　R. C. BERGVALL　　　2,347,026
CONTROL SYSTEM
Filed July 29, 1942　　　2 Sheets-Sheet 1
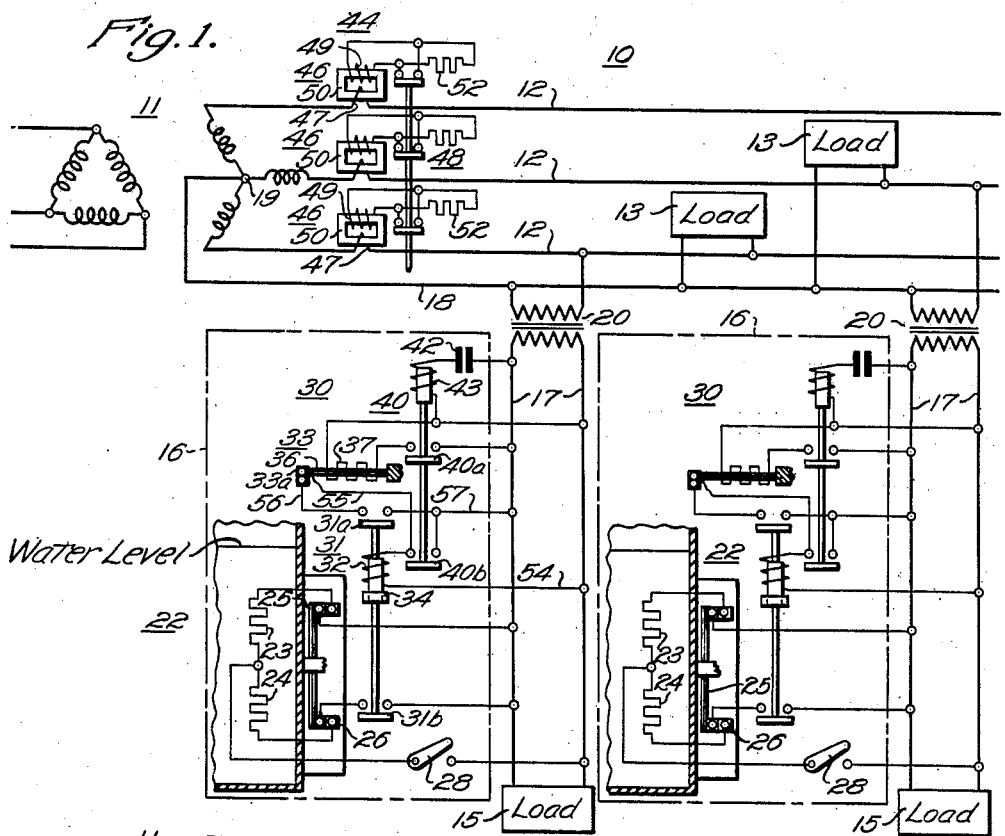
WITNESSES:
Robert C. Baird
F. D. Giolma
INVENTOR
Royal C. Bergvall.
BY
Crawford
ATTORNEY

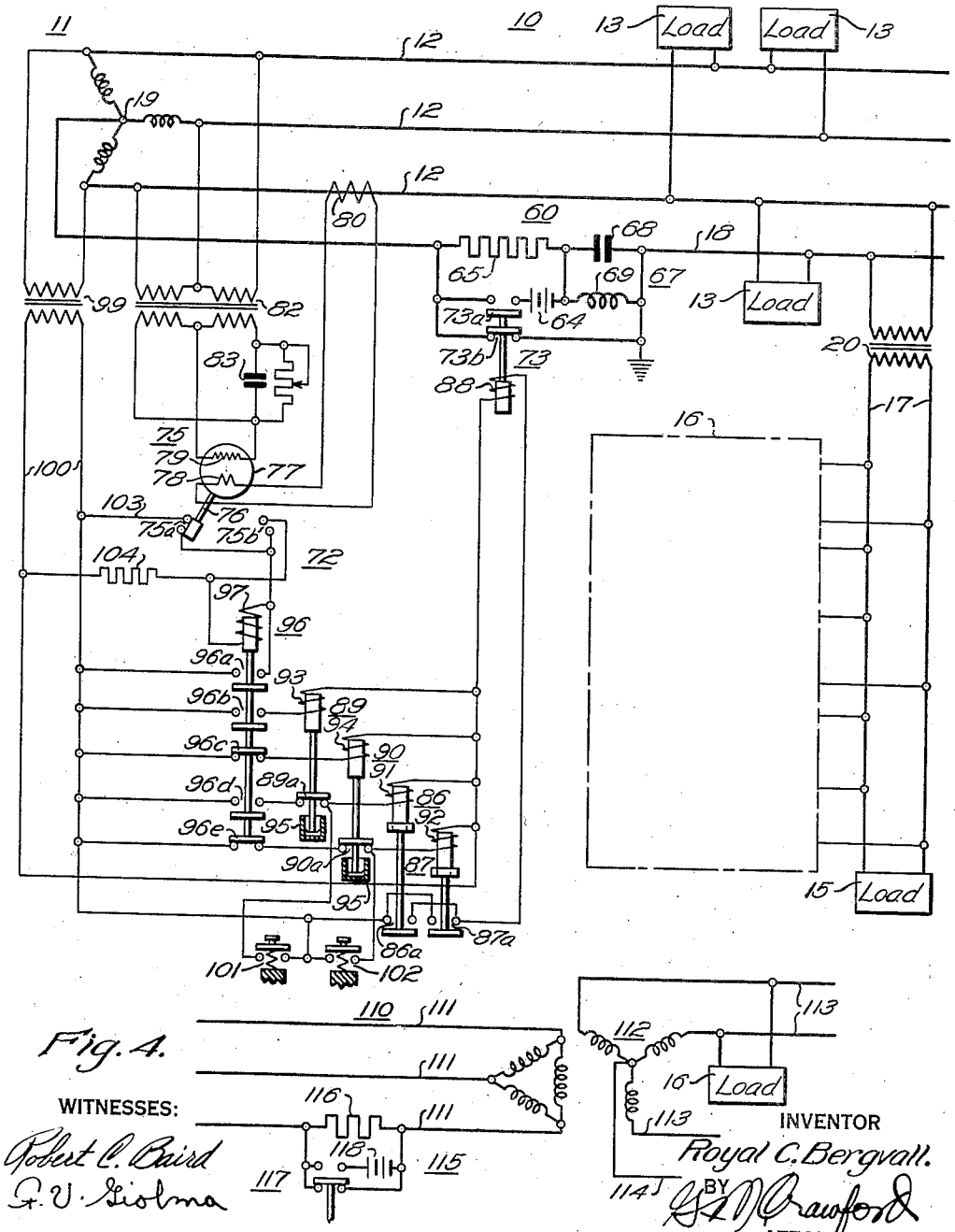

Patented Apr. 18, 1944

2,347,026

UNITED STATES PATENT OFFICE 2,347,026

CONTROL SYSTEM

Royal C. Bergvall, Wilkinsburg, Pa., assignor to Westinghouse Electric & Manufacturing Company, East Pittsburgh, Pa., a corporation of Pennsylvania Application July 29, 1942, Serial No. 452,752

18 Claims. (Cl. 171—97)

My invention relates, generally, to control systems and it has reference in particular to remote control systems for controlling the connection of load devices such as electric signs, street lights, signal or alarm devices, electric water heaters, etc. to power systems.

Generally stated, it is an object of my invention to provide a simple and inexpensive remote control system utilizing the conductors of the power system with which it is used.

More specifically, it is an object of my invention to provide for controlling the connection of selected load devices to a power system by producing predetermined harmonic signals in the system to control the switching means of said load devices.

It is also an object of my invention to provide for producing substantially symmetrical sets of harmonics of the fundamental system frequency in the power system by saturation of magnetic cores associated with the power system for controlling the connection of remotely located selected load devices to the power system.

An important object of my invention is to provide for producing predetermined harmonics of the fundamental system frequency for control purposes by causing a direct current component to flow in at least one of the conductors of the system to effect saturation of the magnetic cores of transformer apparatus connected to the system.

Another object of my invention is to provide a remote control system for electric water heaters and the like which form a portion of the load on a power system, whereby the water heaters may be remotely located from the source and may be selectively connected to the power system in response to predetermined harmonic voltage signals produced in the system adjacent the source and transmitted over the conductors of the power system.

Still another object of my invention is to provide for selectively energizing and/or deenergizing certain load devices in a power system in response to predetermined load conditions of the power system.

Another object of my invention is to provide for utilizing the load current in a power system for producing predetermined harmonic voltage signals by magnetic saturation for controlling the connection of remotely located load devices associated with the system.

A further object of my invention is to provide for automatically controlling the connection of certain load devices to a power system in response to predetermined load conditions in the power system which may be determined principally by other load devices connected to the system.

Other objects will in part be obvious, and will in part be explained hereinafter.

In accordance with my invention the connection of load devices such as water heaters to, and the disconnection thereof from, a power system may be remotely controlled in a simple and effective manner. Control means which may be located adjacent the source or substation of the power system or remotely therefrom produce harmonics of the fundamental system frequency which circulate throughout the system by effecting saturation of the magnetic cores of transformers or other apparatus connected to the system. Relay means associated with the load devices and responsive to predetermined harmonic signals effect connection of the load devices to, or disconnection thereof from, the power system in response to predetermined operations of the control means. Operations of the control means may be effected manually, automatically, or by clocks and the like, or in response to predetermined load and/or power factor conditions of the power system which are usually determined by the general industrial load connected to the power system. The signals may be produced at a central point and transmitted over the power conductors to remotely located load devices, or they may be produced at a number of points in the system in response to signals dispatched by suitable means from a central point.

For a more complete understanding of the nature and scope of my invention reference may be had to the following detailed description which may be read in connection with the accompanying drawings in which:

Figure 1 is a diagrammatic view of a control system embodying the principal features of the invention showing how it may be applied to a power system;

Fig. 2 is a diagrammatic view of a control system embodying a modification of the invention;

Fig. 3 is a digrammatic view of a control system illustrating an application of the invention utilizing load responsive control means; and Fig. 4 is a partial diagrammatic view of a power system embodying a further modification of the invention.

Referring to Figure 1, the numeral 10 may denote, generally, a power system wherein a source such as the transformer 11 may be connected by conductors 12 to supply electrical energy to load devices 13 which may be energized from the conductors either with or without transformers, and other load devices 15 and 16 which may be energized from the conductors 12 through suitable branch conductors 17, connected between the conductors 12 and the neutral conductor 18 which is connected to the neutral point 19 of the transformer 11 by means of distribution transformers 20. The neutral conductor may, for the purposes of this invention, be a metallic conductor, grounded or ungrounded, or may comprise a ground return or an artificial delta neutral.

The load devices 16 may, for example, comprise water heaters 22 having heating elements 23 and 24 disposed to be connected to the conductors 17 through the thermostatic control switches 25 and 26, respectively. A disconnect switch 28 may be provided for disconnecting the heaters from the conductors 17.

In order to selectively effect connection of the heating elements 24 of the water heaters 22 to the power system 10 when the general industrial load may be low, switch means, indicated generally by the numeral 30, may be associated with each water heater. The switch means 30, for example, may comprise an "on" relay 31 for connecting the heating element 24 to the conductors 17 and a normally closed "off" relay 33 for selectively effecting disconnection of the heating element 24 from the conductors 17.

The "on" relay 31 may be adapted to respond to an operating signal of a predetermined duration such as, for example, approximately one second. The "off" relay 33 may be made to respond only to a signal of longer duration such as, for example, from about three to five seconds. The "on" relay 31 may be provided with a short circuit damper winding 34 to retard its operation, and the "off" relay 33 may comprise a bimetallic element 36 which is provided with a heating element 37 requiring energization for the required period before the contact members 33a will open.

The switch means 30 may also comprise a control relay 40 for controlling the energization of the "off" and "on" relays from the conductors 17. In order to make the relay 40 selectively responsive to a predetermined harmonic of the fundamental frequency, a condenser 42 may be connected in series circuit relation with the operating winding 43 thereof to produce series resonance at a predetermined frequency and make the relay selectively responsive, for example, to the third harmonic of the fundamental frequency of the power system which is usually 60 cycles.

For the purpose of controlling the operation of the different control relays 40, suitable control means indicated, generally, by the numeral 44 may be provided. The control means 44 may be located adjacent the source or substation indicated, generally, by the transformer 11 and may operate to produce harmonic control voltages throughout the system in the main and branch circuits in the zero phase sequence current paths of the power system by saturation of magnetic cores of apparatus associated therewith. One method of producing harmonic voltages by saturation of such magnetic cores utilizes current transformers 46 having their primary windings 47 connected in series circuit relation with the conductors 12 and having suitable switch means 48 for substantially open circuiting the secondary windings 49 of the transformers to effect saturation of the transformer cores 50, whereby symmetrical harmonic voltages between each line and neutral may be produced throughout the power system for operating the remotely located control relays 40 in main or branch circuits which control the connection and disconnection of the water heaters or other devices to and from the power system. Suitable control resistors 52 may be connected across the secondary windings 49 of the current transformers 46 to limit the secondary voltages to the safe values. It will be realized that it is not necessary to utilize current transformers 46 in connection with each of the conductors 12. Two, or even one, may be used, though symmetrical sets of harmonics will not be produced in the different phases. The switch 48 may be operated manually, by means of a clock device either remotely or directly, or in some other suitable manner as desired.

In operation, the disconnect switch 28 is normally closed and the heating element 23 is thereby connected to the conductors 17 through the thermostatic switch 26 which normally controls the connection and disconnection of the water heater to and from the power system. When the normal industrial load drops below a predetermined value so that it is desirable to connect the water heating load to the power system, the switch 48 is opened for a predetermined interval of approximately one second. Saturation of the transformer cores 50 is effected by the load current in the conductors 12, so that substantially symmetrical harmonic voltages are produced between the conductors 12 and the neutral conductor 18.

Since the control relay 40 is selectively responsive to one of the harmonics produced—the third harmonic for example—the relay 40 operates, closing contact members 40a and 40b for the duration of the harmonic signal. The "on" relay 31 is energized and operates, closing contact members 31a and 31b. The heating element 24 is thereby connected to the conductor 17 through contact members 31b, and a holding circuit is provided for the operating winding 32 through the contact members 31a extending from one branch conductor 17 through the conductor 54, operating winding 32, conductor 55, contact members 33a, conductor 56, contact members 31a and conductor 57 to the other branch conductor 17. The heating element 37 of the "off" relay 33 is also energized when the control relay 40 closes, however, because of the longer interval required for operation of the "off" relay 33, this relay does not operate and the contact members 33a remain in the closed position. Should the water in the heater attain the desired maximum temperature while the "on" relay 31 is in the operative position, the thermostatic switch 26 disconnects the heating element 23 from the conductor 17 to prevent overheating.

When the industrial load becomes sufficient to require disconnection of the load devices 16, or water heaters 22, from the power system the control switch 48 is opened for a relatviely long time interval such as, for example, five seconds. Harmonic control voltages are thereby produced throughout the system in the zero phase sequence circuit of the power system so that the control relay 40 is rendered operative for the predetermined time interval. Contact members 40a are closed and the heating element 37 of the "off" relay 33 is energized for the duration of the harmonic signal. The contact members 33a open, deenergizing the operating winding 32 of the "on" relay so that contact members 31b open disconnecting the heating element 24 from the conductors 17.

Referring to Fig. 2, the reference numeral 10 may, as hereinbefore, denote, generally, a power system having conductors 12 which may be energized from a suitable source such as the transformer 11 for effecting the energization of industrial loads 13 which may be connected directly to the conductors 12 either with or without transformers and other industrial or domestic loads 15 which may be connected between the conductors 12 and the neutral conductor 18 by means of branch conductors 17 and distribution transformers 20. Additional load devices 16 denoted, generally, by the dot and dash rectangle may also be connected to the branch conductors 17. The load devices 16 in this instance may be similar to the load devices shown and described in connection with Fig. 1 so that all details thereof have been omitted from Fig. 2 in order to simplify the drawings.

In order to provide suitable control signals for effecting connection of the load devices 16 to the branch conductors 17 and disconnection therefrom at the will of an operator at the substation, indicated generally by the transformer 11, control means indicated by the numeral 60 may be provided for producing predetermined harmonic signals in the zero phase sequence current path of the power system. For example, the neutral point 19 of the transformer 11 may be normally connected to ground through a suitable switch 62. The switch 62 may also be operable to connect a source of direct current such as the battery 64 across a resistor 65 connected between the neutral point 19 and ground, so as to introduce a direct current voltage into the zero phase sequence path of the power system. Saturation of the magnetic cores of the transformers 11 and 20 may be thereby effected, producing harmonics of the fundamental system frequency in the zero phase sequence current path.

A suitable filter or wave trap 67 comprising, a condenser 68 and an inductance 69 connected in parallel circuit relation, may be connected between the source 64 and the neutral conductor 18 to block the flow of current of the predetermined harmonic to which the control relay 40 of the load device 16 is responsive. The filter may, for example, block the third harmonic current so that third harmonic voltages appear in the power system.

Operation of the control system is generally similar to that as described in connection with Fig. 1 except in that the switch 62 is moved to engage the contact member 70 and connect the battery 64 across the resistor 65 for the predetermined time intervals to produce the desired harmonic signals for effecting operation of the "on" and "off" relays associated with the load devices 16, instead of opening the control switch 40 as in the system shown in Fig. 1.

In Fig. 3 the reference numeral 10 may again denote, generally, the power system wherein a source or substation, indicated generally by the transformer 11 may be connected by means of conductors 12 to suitable loads 13 and 15, as well as to load devices 16, the connection of which to the load system it is desired to control. The load devices 16 are represented by the dot and dash rectangles only for the purpose of simplification, since the full details of the circuits and connections thereof are clearly shown and described in connection with Fig. 1.

In order to control the operation of the control means 60 producing the harmonic voltage signals as described in connection with Fig. 2, control circuit means denoted, generally, by the numeral 72 may be provided for controlling the operation of the control switch 73 which functions like the switch 62 of Fig. 2 and connects the source 64 to the control resistor 65 in the neutral conductor 18 of the power system.

In order to control the operation of the control switch 73 in response to predetermined load conditions at the source or transformer 11, load responsive means such as the wattmeter type relay 75 may be utilized. The relay 75 may be provided with a movable contact arm 76 which may be attached to a rotatable disc 77 actuated in a well-known manner by means of a current winding 78 and a voltage winding 79. The current winding 78 may be energized by means of a current transformer 80 associated with one or more of the conductors 12, and the voltage winding 79 may be connected to the conductors 12 by a voltage transformer 82. Phase shift means 83 may be connected between the transformer 82 and the voltage winding 79 for changing the adjustment of the relay 75 to effect different responses thereof to load conditions.

In order to provide harmonic signals of different durations, means such as the control relays 86 and 87 may be provided for controlling the energization of the operating winding 83 of the control switch 73. These control relays may be adapted to pick up instantaneously upon energization but have different time delay drop-outs. For example, the control relay 86 may have a relatively short time drop-out so as to return to the deenergized position approximately one second after deenergization, while the control relay 87 preferably has a relatively long time drop-out so that it does not return to the deenergized position until a relatively long time interval after it is deenergized—for example, about five seconds.

Additional control relays 89 and 90 may be provided for effecting momentary energization of the operating windings 91 and 92, respectively, of the control relays 86 and 87. The contact members 89a and 90a of these relays preferably remain closed for a relatively short time after the operating windings 93 and 94 are energized. Dash pots 95 may be utilized for this purpose.

A master control relay 96 having an operating winding 97, whose energization is controlled by the wattmeter-type relay 75, may be utilized for controlling the energization of the operating windings 93 and 94 of the additional relays, as well as that of the control relays 86 and 87, so as to effect operation of the control switch 73 for relatively short or relatively long periods, depending on whether the contact arm 76 of the relay 75 engages the stationary contact members 75a or 75b in response to predetermined minimum or maximum load conditions, respectively.

A control transformer 99 may be utilized for energizing the control buses 100. Switches 101 and 102 may be provided for manually operating the control relays 86 and 87 so that an operator may effect connection or disconnection of the load devices 16 at will.

When the load on the system 10 reaches a predetermined minimum value, the contact arm 76 of the relay 75 engages the contact members 75a and completes an energizing circuit for the operating winding 98 of the master control relay through conductor 103, contact members 75a, operating winding 95 and control resistor 104 back to the control bus 100. The master control relay operates closing contact members 96a, 96b and 96d and opening contact members 96c and 96e. A holding circuit for the master control relay 96 is completed through the control resistor 104 and contact members 96a. The operating winding 93 of the additional control relay 89 is energized through contact members 96b. The operating winding 91 of the control relay 86 is momentarily energized through contact members 96d and the normally closed contact members 89a of the additional control relay 89, which remain in the closed position only for a relatively short interval after the operating winding 96 of the relay is energized.

The control relay 86 operates, closing contact members 86a to complete an energizing circuit for the operating winding 88 of the control switch 73, and remains in the operated position for a predetermined time interval of approximately one second. The operating winding 88 of the control switch is thereby energized for the predetermined time interval and the control switch operates, opening contact members 73b and closing contact members 73a to connect the source 64 across the control resistor 65 for said time interval. A direct current voltage is thus introduced into the zero phase sequence circuit of the power system 10. Harmonic control signals are thereby produced in the zero-phase sequence circuit of the power system for the predetermined interval, so that the control relay 40 of the load device 16 operates to connect the load device to the power system.

When the load on the power system reaches a predetermined maximum value, the contact arm 76 of the wattmeter-type relay 75 leaves the contact members 75a and engages contact members 75b, thus shunting the operating winding 97 of the master control relay 96, so that this relay returns to its deenergized position, opening contact members 96a, 96b and 96d and closing the back contact members 96c and 96e. Energizing circuits are thus provided for the control relay 87 and the additional control relay 90, which opens the normally closed contact members 90a after a predetermined relatively short time interval during which an energizing circuit is momentarily completed through the contact members 96e and 90a for the operating winding 92 of the control relay 87. The control relay 87 operates and remains in the operated position for a relatively long predetermined time interval of approximately five seconds. Energization of the operating winding 88 of the control relay 73 is thus provided for a relatively long interval. The source 64 is thereby connected across the control resistor 65 for a relatively long time interval so as to produce a harmonic voltage signal of relatively long duration in the zero phase sequence circuit of the power system 10 to effect operation of the "off" relay 33 of the load device 16 or water heater 22 to disconnect it from the power system.

Referring to Fig. 4 the numeral 110 may denote generally a portion of a power system, either star or Y-connected, comprising conductors 111, a transformer bank 112 and secondary conductors 113. In order to produce harmonics of the fundamental system frequency between the conductors 113 of the system, or between the conductors 113 and the neutral conductor 114, to control the connection to or disconnection from the power system of a remotely located load device 16, control means 115 may be utilized. The load device may be connected between the conductors 114 and unsymmetrical sets of harmonics may be produced throughout the system by applying a direct current voltage across an impedance 116 connected in series with one of the conductors 111. The control means may comprise a switch 117 which may be operated in any suitable manner to introduce the impedance 116 in the conductor and apply a direct current voltage to it from a source such as the battery 118.

Saturation of the transformers in the bank 112 of the power system may be produced by means of the direct current thus introduced into the power system. By selectively operating the switch 117 to introduce direct current components into the power system it is possible to produce harmonic signals of predetermined durations throughout the system so that the control means of the load devices, such as the load device 16, responsive to one of the harmonics—the third, for example—may be operated in the manner described hereinbefore in connection with the systems of Figs. 1 and 2, to control the connection and disconnection of the load devices to and from the power system.

From the above description and the accompanying drawings it will be apparent that I have provided in a simple and effective manner for selectively controlling the connection of load devices to and the disconnection thereof from a power system either automatically or at will. Since the zero phase sequence network of the power system is utilized as a channel for the control signals effecting connection and disconnection of the load device, no additional control wires are necessary, and the control apparatus is relatively inexpensive to manufacture and relatively simple to operate. Harmonic signals of sufficient strength to insure positive operation of the load device control relays may easily be produced in the system without requiring expensive and complicated high frequency or frequency changing apparatus. Such a system may be readily used with power systems having a path for a zero phase sequence current whether the system be grounded or ungrounded and whether the transformer at the source is Y-connected or delta-connected with an artifical neutral.

Since certain changes may be made in the above description and different embodiments of the invention may be made without departing from the spirit thereof, it is intended that all the matter contained in the above description or shown in the accompanying drawings shall be considered as illustrative and not in a limiting sense.

I claim as my invention:

1. The combination with an alternating current power system, of an iron core impedance device connected in the system, circuit means connected to the power system for effecting saturation of the impedance device to produce a harmonic control voltage in the system, and relay means connected to the power system selectively responsive to predetermined harmonic control voltage signals.

2. A control system for use with an alternating current power system having a source with associated power conductors and a neutral conductor comprising, saturable impedance means connected in the circuit of at least one of the power conductors, circuit means associated with the power system at the source for effecting saturation of the impedance means to produce a harmonic voltage between one power conductor and the neutral of a value greater than normally existant in the power system, and relay means selectively responsive to values of said harmonic voltage greater than normally exist in the power circuit.

3. The combination with an electric power system including a source, a load device and transformer means connected between the source and the load device having a magnetic core structure, of means associated with the power system for saturating the magnetic core structure of the transformer means to produce a predetermined harmonic control voltage in the system, and relay means selectively responsive to predetermined harmonic voltage connected to the power system adjacent the load device operable in response to said harmonic control voltage to control the connection of the load device to the power system.

4. The combination with the zero-phase sequence network of a polyhase alternating current power system, of control means including a current transformer connected in each phase of the system having a saturable magnetic core and circuit means connected to effect saturation of the core for producing substantially balanced harmonic voltages in the zero-phase sequence network, switch means operable to control the connection of a load device to the power system, and relay means selectively responsive to predetermined harmonic voltages produced by the control means operable to control the operation of the switch means.

5. A control system for use with a power system having a zero-phase sequence network and a source of alternating current, a load device and transformer means connected between the load device and the source comprising, means to effect saturation of the magnetic circuit of the transformer means and produce harmonic control voltages in the zero-phase sequence network by saturation, relay means responsive to predetermined of said harmonic voltages, and switch means operable selectively under the control of the relay means to control the connection of load device to the power system.

6. The combination with a polyhase power system having power transformer means connected between a load device and a source, and a path for a zero-phase sequence current, of control means operable to effect magnetic saturation of the transformer means and produce predetermined harmonic control voltages in the zero-phase sequence path, remotely located resonant relay means responsive to a predetermined one of said harmonic voltages, and switch means controlling the connection of the load device to the source of the power system selectively operable in response to different operations of the relay means.

7. The combination with an alternating current power system including a source, a load device, and transformer means connected between the source and load device having saturable core means, of circuit means associated with the power system to produce a direct current component in the power system for effecting saturation of the core means to produce harmonics in the system, and relay means selectively responsive to different signals of a predetermined harmonic voltage produced in the power system by the direct current component connected to the power system at a point remote from the source.

8. A control system for use with a power system having a source of alternating current with conductors for connecting the source to a remotely positioned load comprising, control means associated with the power system adjacent the source including transformer means connected between the source and the load and circuit means operable to effect saturation of the transformer means to produce predetermined harmonic voltage signals in the power system of different durations, relay means adjacent the load operable in accordance with the durations of said predetermined harmonic voltage signals, and switch means controlling the connection of the load to the power system selectively responsive to operations of said relay means of different durations.

9. The combination with an alternating current power system having an alternating current source and a remotely positioned load connected by electric conductors, of means associated with one of the conductors including an impedance device having a magnetic core member with a winding connected in series relation with said one conductor and circuit means for saturating the core member effective to produce a third harmonic voltage in the power system, switch means controlling the circuit means operable to produce third harmonic voltages of different duration in the system, control means connected to the power system adjacent the load responsive to predetermined values of the third harmonic voltage in accordance with the duration thereof, and switch means selectively responsive to operations of the control means of different durations to control the connection of the load to the source.

10. A control system for use with a power system having a polyphase source of alternating current connected to a plurality of load devices by conductors comprising, a saturable reactor having a magnetic core member provided with a primary winding in series with one of the conductors and a secondary winding, control means operable to increase the impedance of the secondary winding for predetermined intervals of different durations so as to effect saturation of the core member and produce harmonic voltage pulses of different durations in the system, relay means selectively operable in response to harmonic voltage pulses of different durations connected to the power system adjacent the load, and means controlling the connection of the load to the power system controlled by the relay means.

11. The combination with a polyphase power system having a plurality of different phase conductors and a path for a zero-phase sequence current and a remotely located load device, of control means responsive to a predetermined harmonic voltage signal to effect connection of the load device to the power system, additional control means responsive to a different harmonic voltage signal to effect disconnection of the load device from the power system, and means including a saturable core reactor connected in series circuit relation with one of the phase conductors and circuit means for saturating the core associated with the power system to produce different harmonic voltage signals including the predetermined one to operate the control means and effect connection to and disconnection from the power system of the load device.

12. A control system for use with an alternating current power system having a load connected to a source by transformer means having magnetic core means comprising, means selectively responsive to predetermined harmonic signals of different durations operable to control the connection of the load to the source, circuit means including a source of direct current to introduce a direct current voltage into the power system for saturating the magnetic core means so as to produce harmonic voltages in the system, and control means responsive to predetermined load conditions operable to control the cricuit means produce harmonic signals of different durations for operating the first-mentioned means and effecting connection and disconnection of the load device from the source.

13. A control system for use with power systems having paths for zero-phase sequence currents comprising, control means operable to produce harmonic voltage signals of different durations in the power system in response to different load conditions at a point in the system, and circuit means associated with a remotely located load device selectively operable in response to said signals of different durations to effect connection to and disconnection from the power system of said remotely located load device.

14. A control system for a plurality of water heaters located at different points on a power system having a path for a zero-phase sequence current comprising, a thermostatic control device for each heater, relay means responsive only to a predetermined harmonic voltage connected to the power system adjacent a water heater, switch means responsive to an operation of the relay means for a predetermined time to effect connection of said water heater to the power system, additional switch means responsive to operation of the relay means for a different predetermined time to effect disconnection of said water heater from the power system, and means associated with the power system adjacent the source operable to produce harmonic signal voltages of different durations in the power system to effect said predetermined operations of the relay means.

15. A control system for a plurality of heater devices disposed to be connected to a power system having a path for zero-phase sequence currents and having other load devices connected thereto comprising, relay means associated with each heater device operable in response to harmonic signals of different durations to selectively control the connection of the heater device to the power system, and control means associated with the power system adjacent the source operable in response to current and voltage conditions at the source to produce harmonic signals of different durations and effect operation of the relay means for a period of one duration when the kilowatt load at the source reaches a predetermined minimum value and operation of the relay means for a period of a different duration when the kilowatt load at the source reaches a predetermined maximum value.

16. A remote control system for a plurality of load devices disposed to be connected to a power system having transformer means with saturable core means connected between the source and the load and having a path for zero-phase sequence currents comprising, a load responsive device connected to the power system adjacent the source, control means operable under the control of said load responsive device to effect saturation of the core means and produce predetermined harmonic voltage pulses in the zero-phase sequence path of different durations when the load at the source reaches predetermined minimum and maximum values, switch means controlling the connection of each load device to the power system, and relay means selectively responsive to harmonic voltage pulses of different durations effecting operation of the switch means to connect each heater device to the power system when the load at the source reaches a predetermined minimum value and disconnect it therefrom when the load at the source reaches a predetermined maximum value.

17. A control system for a remotely located water heater disposed to be connected to transformer means having a saturable core to an alternating current power system having a neutral conductor comprising, a resonant relay responsive to a harmonic of the fundamental frequency of the system, switch means selectively responsive to operations of said relay for periods of different durations to connect the water heater to and disconnect it from the power system, load responsive means, and control means selectively responsive to different operations of the load responsive means to effect saturation of the transformer core for periods of different durations and produce harmonic voltage impulses of different durations to effect different operations of the switch means.

18. A control system for use with an alternating current power system having a plurality of conductors and transformer means with saturable magnetic core means for connecting a load device to a source comprising, control means operable to connect a direct current source to one of the conductors for predetermined intervals of different durations to introduce a direct current component for saturating the core means of one of the transformer means to produce a harmonic signal voltage of the fundamental system frequency in the power system, and additional control means selectively responsive to said harmonic of the fundamental system frequency connected to the conductors selectively operable in response to operations of the control means of different durations to effect connection of the load device to and disconnection from the power system.

ROYAL C. BERGVALL.